United States Patent [19]
Heinz

[11] Patent Number: 5,305,625
[45] Date of Patent: Apr. 26, 1994

[54] ADJUSTABLE CUTOFF APPARATUS

[75] Inventor: Richard D. Heinz, Grand Haven, Mich.

[73] Assignee: Shape Corporation, Grand Haven, Mich.

[21] Appl. No.: 948,150

[22] Filed: Sep. 18, 1992

[51] Int. Cl.$^5$ .............................................. B21D 28/00
[52] U.S. Cl. ..................................... 72/132; 72/166; 72/129; 83/743; 83/308; 83/456
[58] Field of Search ................. 72/129, 132, 166, 169, 72/294, 338; 83/743, 316, 308, 454, 456

[56] References Cited

U.S. PATENT DOCUMENTS

| | | | |
|---|---|---|---|
| 864,453 | 8/1907 | Day | 83/743 |
| 871,532 | 11/1907 | Stanton | 83/316 |
| 2,725,753 | 12/1955 | Haug | 83/743 |
| 3,010,491 | 11/1961 | Pearson | 72/132 |
| 3,140,739 | 7/1964 | Moltchan | 72/129 |
| 3,277,758 | 10/1966 | Greenberger | 83/316 |
| 4,627,254 | 12/1986 | Kitsukawa | 83/316 |
| 4,872,384 | 10/1989 | Borzym | 83/454 |

FOREIGN PATENT DOCUMENTS 2209272  8/1973  Fed. Rep. of Germany ........ 83/308

OTHER PUBLICATIONS

Exhibit B includes product literature on cutoff equipment and related equipment published by American Machine and Rollform Tech., Inc., Salem Oreg., publication date unknown but published before the filing of the present application, and author unknown.

Exhibit A includes literature entitled "The Powerline Press-High-Tech Industry Innovation for Roll Formers", published by American Machine and Rollform Tech., Inc., Salem Oreg. dated Spring 1992, author unknown.

Primary Examiner—Daniel C. Crane
Attorney, Agent, or Firm—Price, Heneveld, Cooper, Dewitt & Litton

[57] ABSTRACT

A cutoff apparatus is adapted to be positioned adjacent a roll-forming machine, and is particularly adapted for adjustably receiving and cutting bumper-length segments from a swept elongated shape made of high strength steel being extended from the roll-forming machine. The cutoff apparatus includes a carriage with rollers for rollingly engaging the elongated shape to align the carriage with the elongated shape, the carriage being adapted to periodically move with the roll-formed shape for a short distance as the roll-formed shape is being formed. The cutoff apparatus further includes a blade operably mounted to the carriage for cutting segments from the roll-formed shape on the fly. An overhead supporting device supports the carriage in a counterbalanced condition so that the carriage can pivot and/or translate as necessary to minimize undesirable stress on the roll-formed shape as the roll-formed shape extends through the carriage, thus providing a reduced need to critically align and maintain the alignment of the cutoff apparatus with the roll-formed shape.

37 Claims, 9 Drawing Sheets

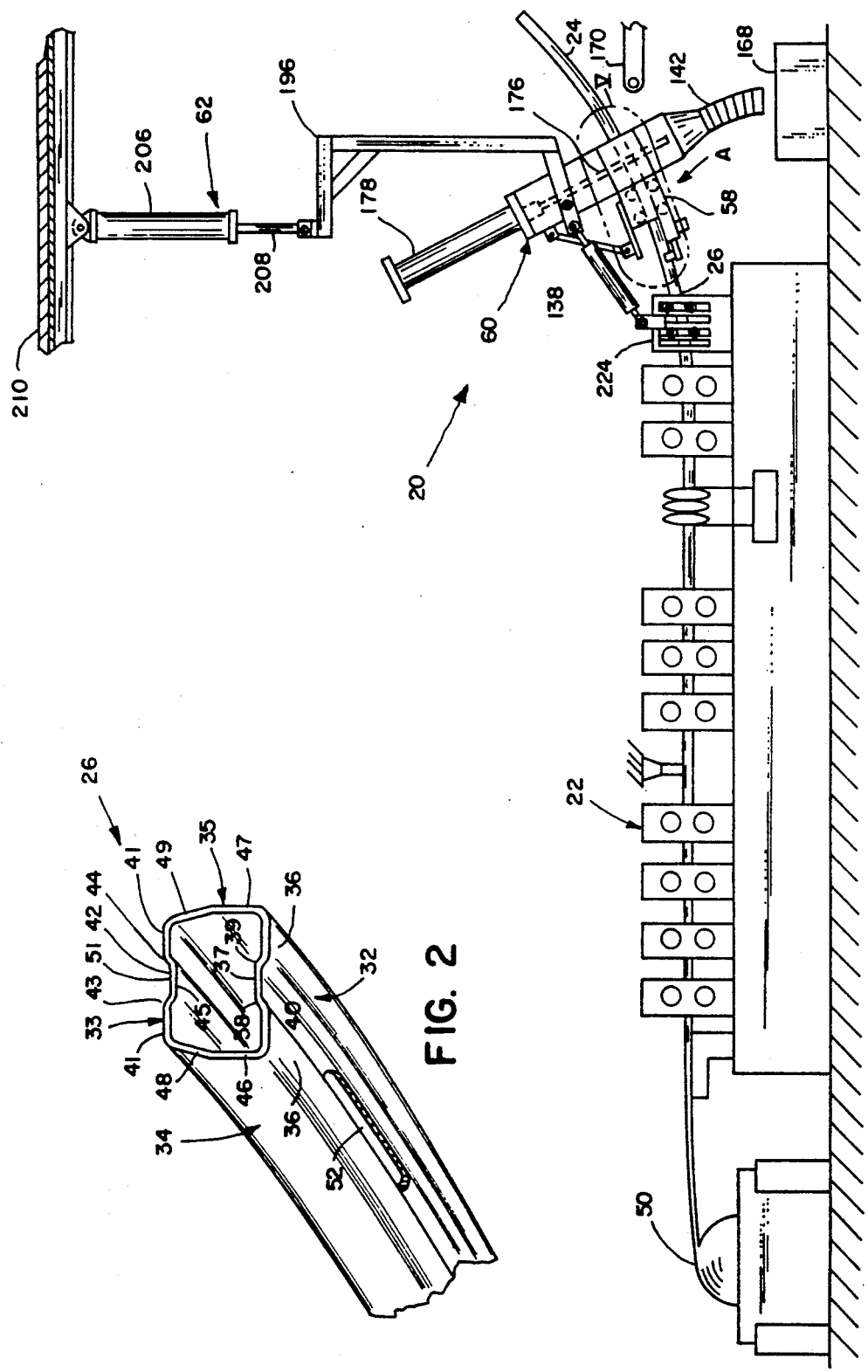

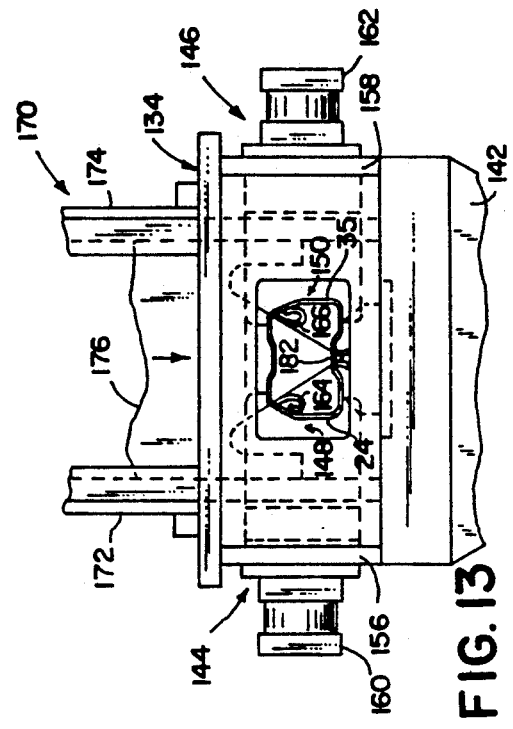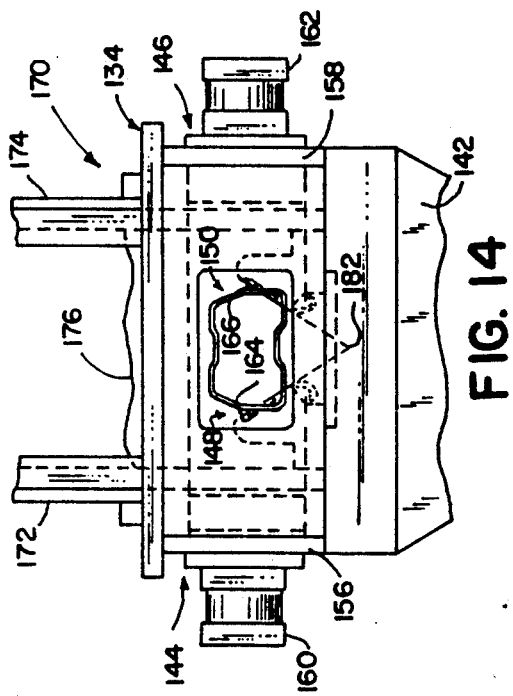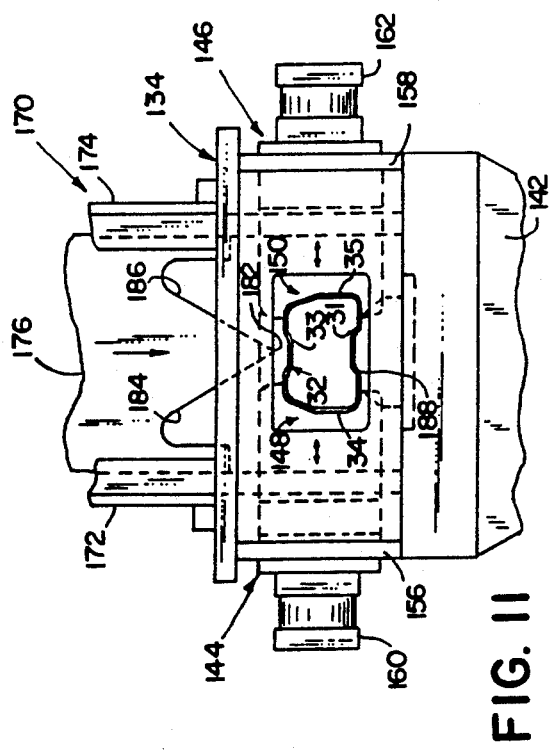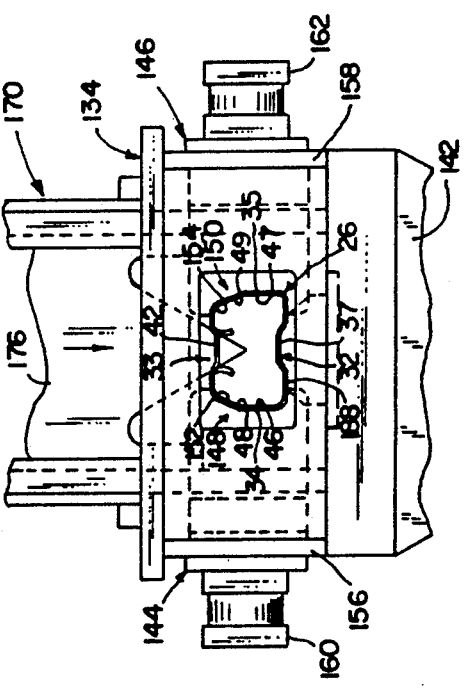

ADJUSTABLE CUTOFF APPARATUS

BACKGROUND OF THE INVENTION

The present invention relates to a cutoff apparatus, and in particular to a cutoff apparatus adapted to cut bumper-length segments from an elongate shaped being made in a continuous roll-forming process.

Recently, an apparatus and process was invented to manufacture roll-formed tubular vehicle bumpers that are longitudinally curved or swept. (See U.S. Pat. No. 5,092,512 and U.S. Pat. No. 5,104,026). The roll-formed bumpers are made from a strip of high strength steel alloy of about 60 to 120 ksi tensile strength or more which is roll-formed into a tubular shape and swept longitudinally to form a longitudinally curved shape. The elongate shaped is then cut into bumper-length segments which are subsequently prepared as needed to form automotive bumpers or bumper reinforcement bars. The above noted process is particularly economical since high strength-to-weight bumpers can be made with very high strength materials at a competitive cost and at high production rates.

It is known to position a cutoff device in-line with a roll-forming machine to cut segments from an elongated shaped element during the roll-forming process. However, traditional cutoff devices are not adapted to sever a longitudinally curved shaped element such as a bumper made of high strength materials as in the elongated shaped bumper noted above. For example, the traditional cutoff devices utilize a track to guide the cutoff mechanism of the traditional cutoff device during the cutoff stroke. However, use of a track requires that the track be accurately aligned with the elongated shaped bumper so that there will not be any interfering misalignment between the track and the high strength elongated shaped bumper. In particular, any such interference can cause poor part quality, excessive wear on the cutoff device, and/or binding on the cutoff device. Notably, alignment is particularly difficult to achieve and/or maintain when the elongated shaped bumper is longitudinally curved. Further, use of a curved track necessarily requires that the track be changed, adjusted, and/or realigned every time the bumper-forming process is changed over to make a different bumper having a different degree of sweep. Hence, a cutoff device is desired that self-aligns with the elongated shaped bumper.

Another problem is that many traditional cutoff devices utilize a saw blade. This can result in excessive downtime caused by frequent blade changes since the bumper is made of high strength steel and has a large section to cut through. Thus, a cutoff device is desired that is long lasting, but which is maintainable by traditional die maintenance methods.

One type of cutoff device that has been used includes semi-stationary cutoff dies that are made to receive the bumper, the cutoff dies being adapted to move along the path of the bumper during a cutting stroke as a bumppress arrangement stamps the dies to shearingly cut the elongate shaped. (See FIGS. 16 and 17 labelled as prior art in the attached drawings.) The cutoff dies include cammed die slides for trimming the sides of the bumper, and also include a center die for trimming the center web of the elongated bumper. These cutoff dies require that the inside of the elongated bumper be supported so that the cutoff dies do not crush the bumper during the stamping/cutoff process. However, supporting the inside of a bumper in an exact location so that the cutoff dies can shearingly engage same is difficult if not impossible to achieve. Further, even if a way to support the inside of the tube is devised, the cutoff dies are sensitive to alignment and will tend to hang up or wear undesirably unless the dies are fully aligned with the path of the bumper. Further, the press can tend to "walk" out of alignment due to vibration from the stamping/cutoff process. This problem is compounded since the die stamping press cannot be permanently anchored to the floor, but rather must be adjustably mounted to the floor so that the location of the die stamping press can be adjusted to receive bumpers having different levels of sweep.

Another cutoff device sometimes used to cut rollformed shapes is a traditional band saw type cutoff device. However, these devices require a track to move along a curved path, as discussed above, and further require frequent maintenance such as blade changes due to blade wear from the high strength steel used in the above noted process.

Thus, a cutoff apparatus is desired for solving the aforementioned problem. In particular, a cutoff apparatus is desired which is self-aligning, readily maintainable, long-lasting in service, and readily adjustable for different levels of sweep, but which is relatively noncomplex in operation.

SUMMARY OF THE INVENTION

The present invention includes a cutoff apparatus for cutting segments of predetermined length from an elongated shaped article such as a bumper made on a continuous process. The cutoff apparatus includes a carriage movably positioned adjacent the elongated shaped article, the carriage including means for engaging the article to align the carriage with the article and being normally held in a stationary ready position but being movable along with the article periodically. The cutoff apparatus also includes a cutting means operably mounted to the carriage for cutting the article, such as a bumper, at a predetermined location so as to separate a segment of predetermined length from the bumper or other article, the cutting means being normally held in a retracted position but movable through a cutting stroke during which the segment is cut free from the bumper. The cutoff apparatus still further includes means for moving the carriage along with the bumper during the cutting stroke. A counterbalance means is provided to movably support the carriage and cutting means in a counterbalanced condition so that the weight of the carriage and the cutting means is carried by the counterbalance means, but so that the carriage and cutting means are allowed to pivot and translate as necessary for alignment with the bumper or other article during the cutting stroke.

The present invention includes several advantages over known art. The apparatus automatically adjusts to variations in speed of manufacture or minor changes in the degree of curvature (sweep) in the bumper or other article as the bumper is being continuously formed. Also, the apparatus can be readily adjusted to different longitudinal curvatures as different bumpers are being made on the roll-forming machine. Further, the apparatus is relatively non-complex in operation and includes relatively long-lasting components that are maintainable by traditional die maintenance methods. Still further, nonproductive waste such as machine down time due to misalignment problems or replacement of worn parts are minimized. Another important advantage is that it eliminates in substantially all roll-forming processes the necessity of elevating the roll-forming machinery to accommodate the sweep of the tubular bumper.

These and other features, advantages, and objects of the present invention will be further understood and appreciated by those skilled in the art by reference to the following specification, claims, and appended drawings.

BRIEF DESCRIPTION OF THE DRAWINGS

FIG. 1 is a side view of a cutoff apparatus and roll-forming machine embodying the present invention;

FIG. 2 is a fragmentary perspective end view of an exemplary elongate shaped;

FIG. 11 is a cross-sectional view taken along the lines XI—XI in FIG. 7, the blade being in the fully retracted position;

FIGS. 12-14 are views similar to FIG. 11 but with the blade being shown in various extended positions as the blade is extended through the cutting stroke;

DESCRIPTION OF PRIOR ART

Figure 16:
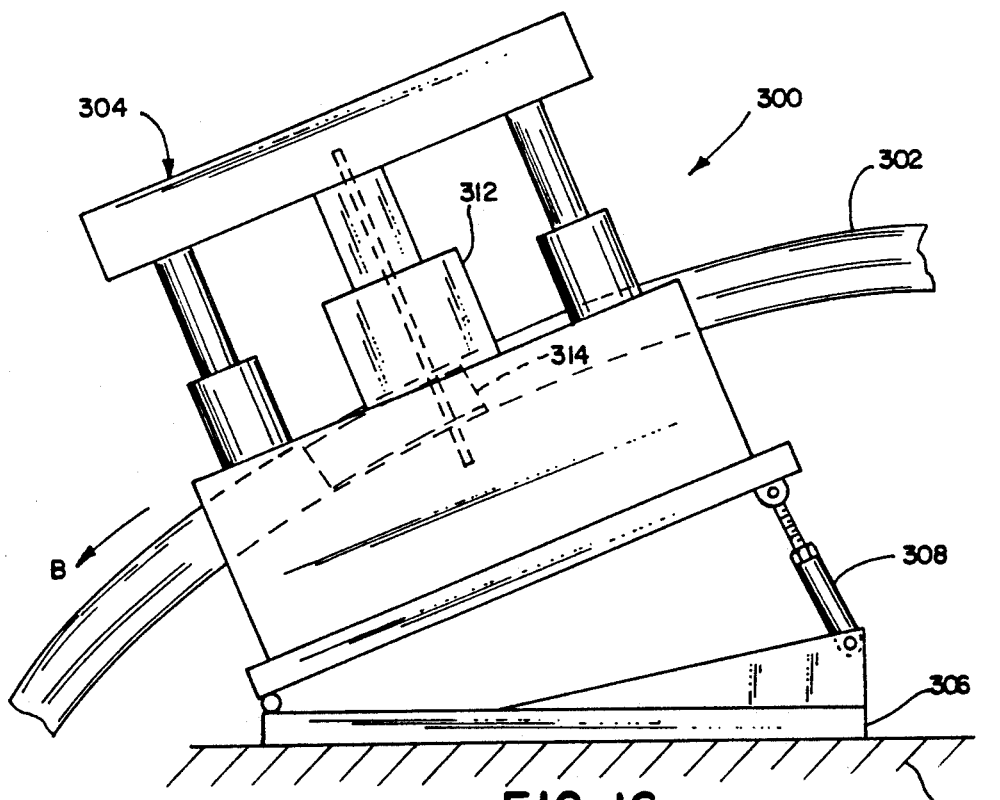
FIGS. 16-17 are views showing a die-stamping-type cutoff device of prior art.
Figure 17:
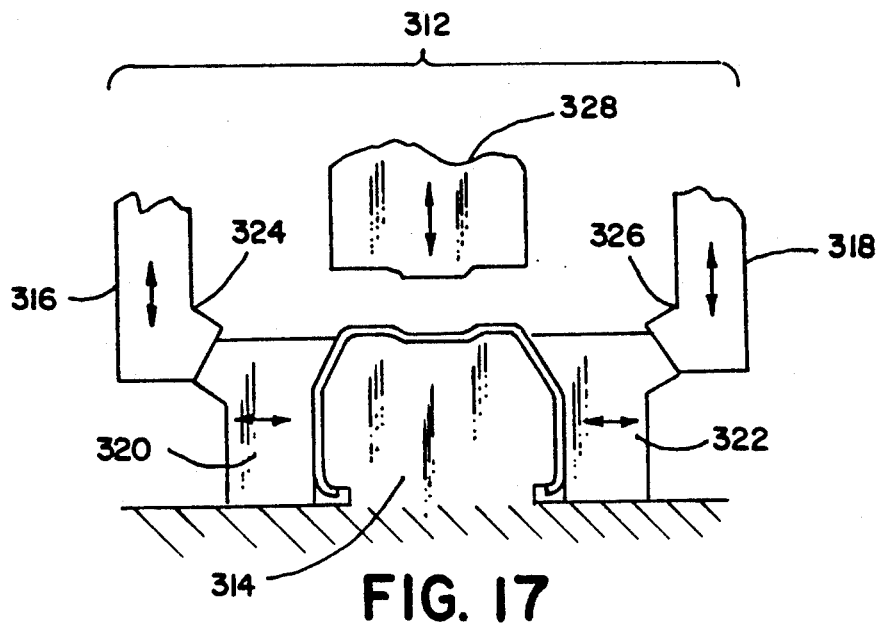

FIGS. 16 and 17 show a cutoff device 300 found in prior art for cutting off a longitudinally curved elongated shaped element 302, such as a bumper, element 302 having a C-shaped cross section. Device 300 requires the roll-forming machinery to be elevated to accommodate the downwardly curved bumper as it is being formed.

Cutoff device 300 includes a press 304 adjustably mounted to a platform 306 by an adjustable linear brace 308 so that the angular position of press 304 can be adjusted, platform 306 being movable on floor 310 so that the location of press 304 can be adjusted relative to the roll-forming machine (not shown) from which elongated bumper element 302 extends. Upper and lower mating cutoff dies 312 and 314 are secured to press 304 so that elongate shaped element 302 can be operably extended therethrough. In particular, lower die 314 (FIG. 17) matingly receives and supports the inside of bumper element 302, with upper die 312 positioned to closely engage lower die 314 during the cutting stroke to shearingly separate successive bumper-length segments from the elongated shaped element 302.

When press 304 is triggered to cut off the bumper element 302, cutoff dies 312 and 314 temporarily move with bumper element 302 in the direction B as die 312 is cycled toward die 314. In the example shown (FIG. 17), die 312 includes camming blocks 316 and 318 that slideably engage slide blocks 320 and 322 for shearing the side flanges of elongate shaped 302, side blocks 316 and 318 including reliefs 324 and 326 that allow slide blocks 320 and 322 to move back out of the way as center die 328 of cutoff die 312 continues to move downwardly to shear the upper web of elongate shaped 302. Notably, cutoff dies 312 and 314 require that the inner portion of bumper element 302 being formed be supported during the step of cutting off the bumper element 302 so that bumper element 302 does not crush during the cutting stroke. Also, alignment of bumper element 302 with cutoff dies 312 and 314 is important so that slide blocks 320 and 322 do not hang up on elongate shaped 302 during the cutoff operation.

Figure 19:
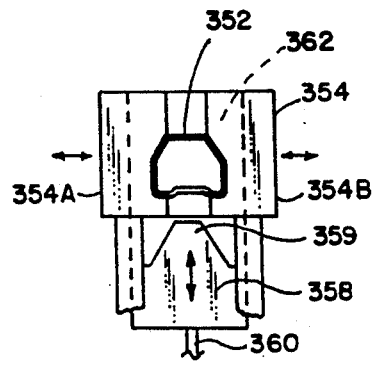
FIGS. 18-19 are views showing a second cutoff device of prior art.
Figure 18:
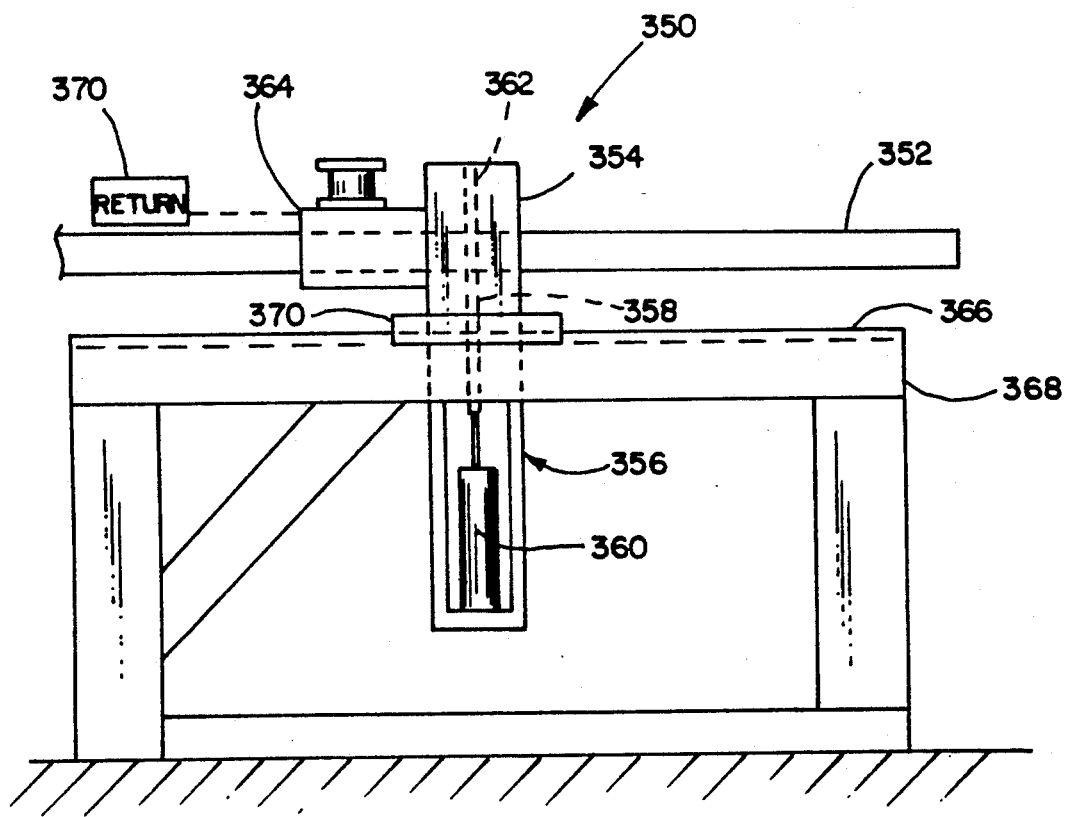

FIGS. 18 and 19 show a second cutoff device 350 found in prior art for cutting off a linear elongated shaped frame element 352, frame element 352 having a tubular cross section. Cutoff device 350 includes a tube support 354 with laterally movable clamps 354A and 354B that are movable into engagement with frame element 352 during a cutting stroke for supporting the walls of frame element 352. Cutoff device 350 also includes a blade assembly 356 having a blade 358 for shearingly cutting frame-length segments from the shaped element 352 and also having a linear actuator 360 for extending blade 358 through a slot 362 in tube support 354 and shearingly into engagement with elongated shaped element 352. Notably, blade 358 includes a tip 359 that enters aperture 368 in elongated shaped element 352 (FIG. 19) as blade initially engages element 352, aperture 368 allowing blade 358 to partially enter the inside of tubular elongate shaped element 352 before shearingly engaging it so that it does not unacceptably crush during the cutting stroke. Cutoff device 350 further includes a locater assembly 364 for locating the cutoff device 350 to the elongated shaped element 352 during the cutting stroke. Cutoff device 350 further includes a locater assembly 364 for engaging and locating the cutoff device 350 to element 352 during the cutting stroke. A frame 368 slidingly supports cutoff device 350, frame 368 including a track 366 operably engaged by follower/bearing 370 on the bottom of tube support 354 for guiding the movement of cutoff device 350 along with element 352 during the cutting stroke of blade 358. A return mechanism 370 returns cutoff device 350 to a home position where cutoff device 350 is ready to begin the next cutting stroke.

DETAILED DESCRIPTION OF THE PREFERRED EMBODIMENT

For purposes described herein, the terms upper, lower, right, left, rear, front, vertical, horizontal, and derivatives thereof shall relate to the invention as oriented in FIG. 1 with the roll-forming machine located generally on the left or upstream, and the cutoff apparatus being located generally on the right or downstream at the end or output of the roll-forming machine. However, it is to be understood that the invention may have various alternative orientations except where expressly specified to the contrary. It is also to be understood that the specific devices and processes as illustrated in the attached drawings and described in the following specification are simply exemplary embodiments of the inventive concept as defined in the appended claims. Hence, specific dimensions and other physical characteristics related to the embodiments disclosed herein are not to be considered as limiting unless the claims expressly state otherwise.

An adjustable cutoff apparatus 20 (FIG. 1) embodying the present invention is positioned adjacent a roll-forming machine 22 near an output end thereof. Cutoff apparatus 20 is particularly adapted for cutting segments 24 from an elongated shaped element or bumper element 26 on the fly as the bumper element 26 is continuously being formed on a roll-forming machine 22, and in particular is suited for cutting off swept bumper-like segments 24 from a longitudinally curved or swept tubular bumper element 26 made from high strength steel as bumper element 26 extends from the illustrated roll-forming machine 22. The illustrated bumper-like segment 24, roll-forming machine 22, and method of making roll-formed bumpers are disclosed in more detail in U.S. Pat. No 5,092,512 to Sturrus et al. issued Mar. 3, 1992, entitled METHOD OF ROLL-FORMING AN AUTOMOTIVE BUMPER, the entire contents of which are incorporated hereinafter by reference.

Notably, a variety of different tubular elongate shaped elements can be cut by cutoff apparatus 20. However, this apparatus was especially designed for cutting a tubular bumper and therefore for purposes of describing the preferred embodiment of the cutoff device 20, a particular elongated shaped bumper element 26 is described hereinafter. Elongated shaped bumper element 26 (FIG. 2) is made from a sheet of high strength steel of about 60 to 120 ksi which is roll-formed into a tubular shape, welded and swept longitudinally to form a longitudinally curved shape. Bumper element 26 has a cross-sectional tubular profile including a front side 32, a rear side 33, a top side 34, and a bottom side 35. Front side 32 includes a main wall section 36 with an indentation 37 centrally located therein, indentation 37 having an upper ledge 38, a lower ledge 39, and a central portion 40. Rear side 33 also includes a main wall section 41 with a centrally located indentation 42 that opposes indentation 37, indentation 42 being composed of an upper ledge 43, a lower ledge 44, and a central portion 45.

The elongated shaped article or bumper element 26 is formed from an elongated sheet unwound from a coil of stock 50 (FIG. 1), the sheet being roll-formed into a tubular shape and include abutting side edges that are welded together at weld 51 in central portion 45. Top side 34 and bottom side 35 include parallel wall sections 46 and 47, respectively, that are connected to front side 32 and extend rearwardly toward rear side 33. Top side 34 and bottom side 35 further include inclined wall sections 48 and 49, respectively, that extend from parallel wall sections 46 and 47, respectively, and connect to rear side 33. Apertures 52 are periodically located in the bumper element 26 to form an opening in segment 24 as required for air flow or parking lights in a finished bumper of a vehicle.

Notably, as shown in the drawings, bumper element 26 is oriented with front side 32 oriented downwardly so that the longitudinal arcuate sweep in bumper element 26 takes it upwardly away from the floor as it extends from roll-forming machine 22. Advantageously, this places weld 51 on the upwardly facing side of bumper element 26 as shape 26 is being processed in machine 22. Thus, weld 51 is in a readily viewable position where it is easier to view the quality of weld 51 so that adjustments can be made to control the quality. Also, the material heated by weld 51 tends to shrink upon cooling in a manner that causes bumper tube element 26 to curl toward the side that weld 51 is located on, thus providing increased clearance to the floor as bumper tube element 26 curls upwardly away from the floor as it extends from roll-forming machine 22. Still further, this orientation places shaped apertures such as aperture 52, in front side 32 in a downward orientation so that apertures 52 can be used to locate where cutoff apparatus 20 cuts the bumper element 26, as described below.

The focus of the present invention lies in cutoff apparatus 20 (FIG. 1) which tracks with the elongated bumper element and cuts it into desired lengths while supporting the same by a counterbalancing means so as to make the cutoff apparatus substantially "weight free" to substantially eliminate the bumper element from bearing the weight of the cutoff apparatus.

Cutoff apparatus 20 includes a carriage or housing 58 adapted to receive and guide the unsevered bumper elements 26. Operably mounted on carriage 58 is cutting means 60 for periodically shearingly severing bumper-like segments 24 from elongated bumper element 26. Carriage 58 and cutting means 60 are operably supported from overhead in a counterbalanced condition by a suspended counterbalanced means 62 so that housing 58 and cutting means 60 of cutoff apparatus 20 can operably move during the cutting stroke of cutting means 60 without the weight of carriage 58 and cutting means 60 resting unacceptably heavily on bumper element 26.

Figure 7:
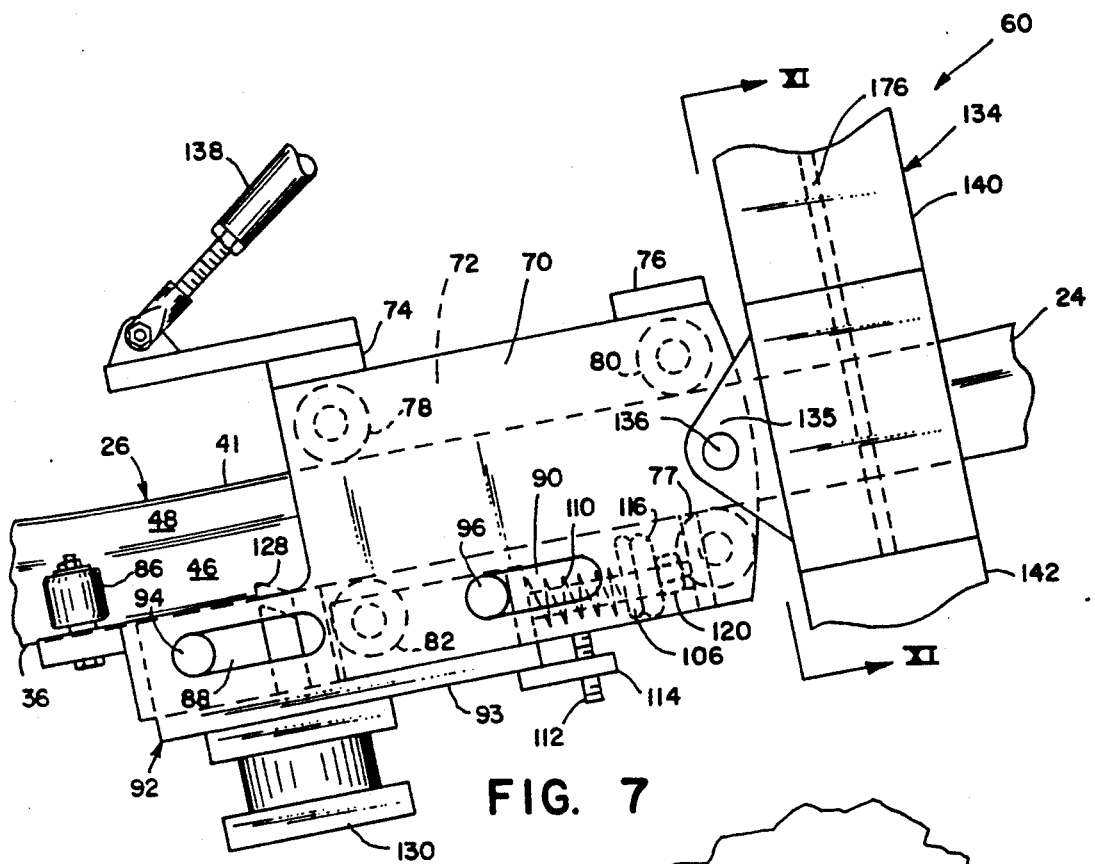
FIG. 7 is an enlarged side view of the circled portion VII in FIG. 1, the locator pin and locator assembly being shown in a normal first position, but the locator pin also being shown in phantom in an extended position whereat the locator pin has been extended into an aperture in the elongated shaped element.
Figure 9:
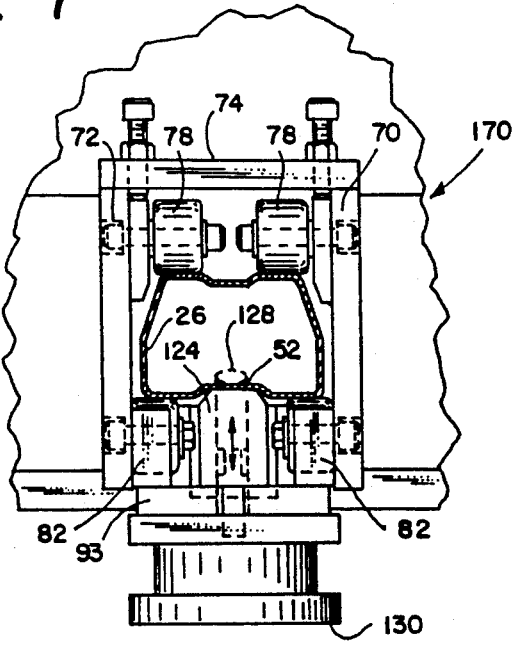
FIG. 9 is a cross-sectional view taken along the lines IX—IX in FIG. 8.
Figure 8:
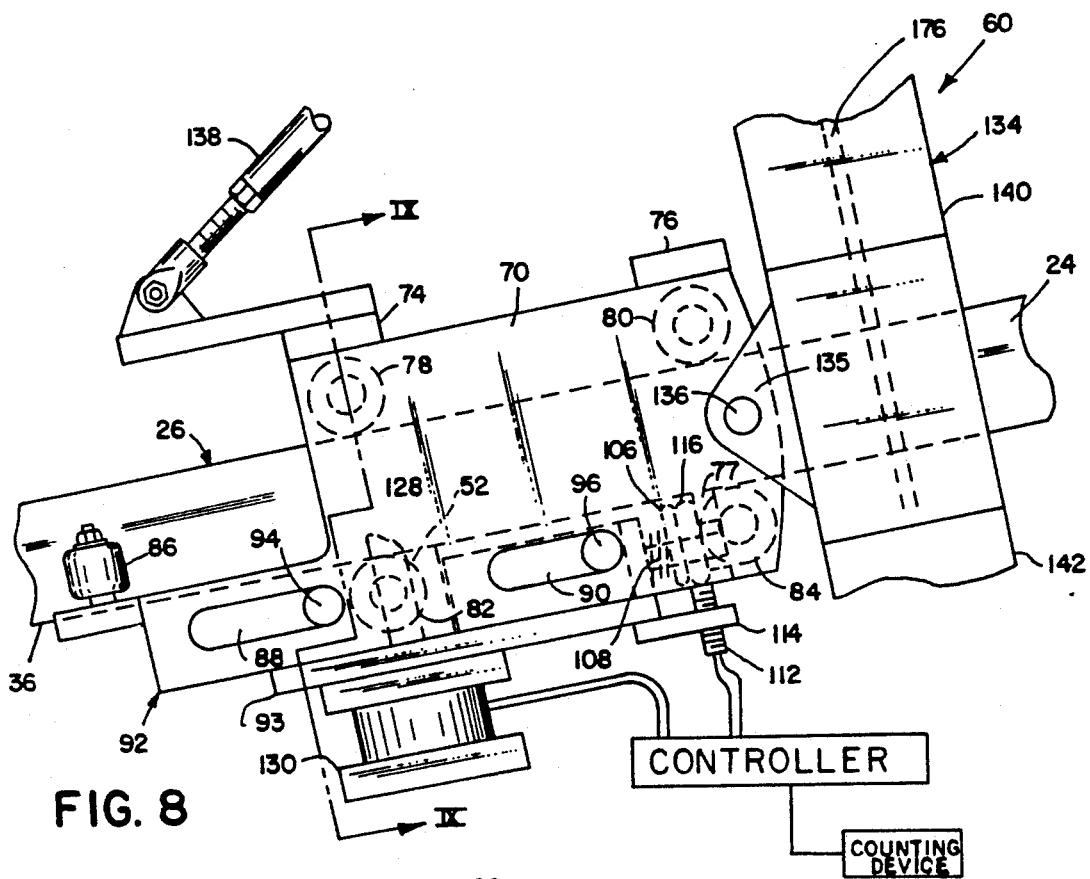
FIG. 8 is a side view of the pickup apparatus as shown in FIG. 7 but with the locating pin engaged in the elongated shaped element and the locator assembly moved downstream to the blade actuating position.

In particular, carriage 58 (FIGS. 7, 8 and 9) is an inverted U-shaped member including side plates 70 and 72 (FIG. 9) interconnected by upper cross braces 74 and 76 and trailing end plate 77. Side plates 70 and 72 are spaced apart sufficiently to receive the elongated shaped bumper element 26 therebetween. A pair of upper leading rollers 78 and a pair of trailing rollers 80 extend laterally inwardly from side plate 70 and 72 toward each other and form an arrangement of four rollers for rollably engaging the rear side main wall section 41 of bumper element 26 (FIGS. 7-8). Similarly, a pair of lower leading rollers 82 and a pair of lower trailing rollers 84 extend laterally inwardly from side plates 70 and 72 toward each other and form an arrangement of four rollers for rollably engaging the front side main wall section 36 of bumper element 26. Rollers 78, 80, 82, and 84 form a system of rollers that capture and rollingly engage bumper element 26, thus continuously and automatically angularly positioning/aligning carriage 58 relative to bumper element 26. Mounted to the leading end of carriage 58 on the inside of side plates 70 and 72 are opposing rollers 86 that center carriage 58 on bumper element 26 from side to side. Notably, all of rollers 78, 80, 82, 84, and 86 are adjustably retained to carriage 58 so that they can be adjusted for differently sized and shaped bumper elements.

Figure 10:
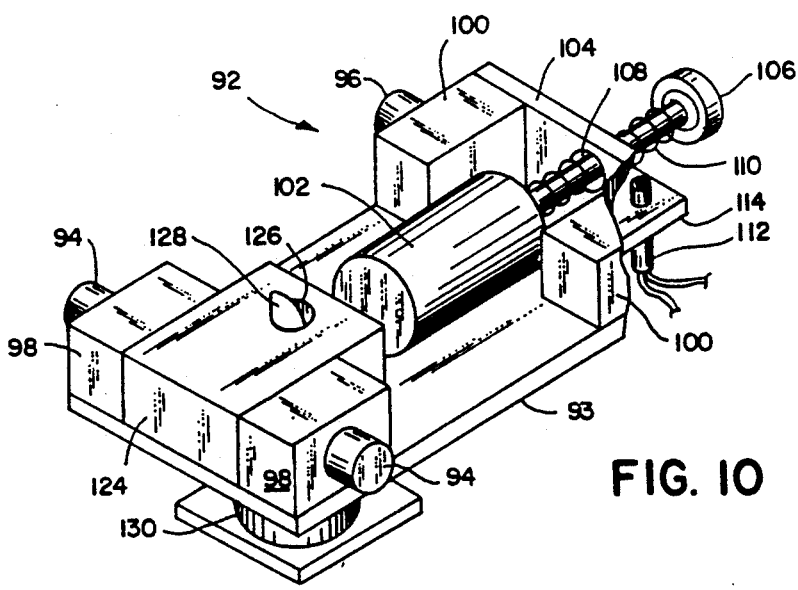
FIG. 10 is a top perspective view of the locator assembly.

Carriage side plates 70 and 72 extend downwardly below lower rollers 82 and 84, each side plate including a leading slot 88 and a trailing slot 90. A movable locator assembly 92 (FIG. 10) is slideably mounted between the lower portion of side plates 70 and 72 adjacent slots 88 and 90. In particular, locator assembly 92 includes a base plate 93 with pairs of front and rear mounting blocks 98 and 100 mounted at the corners of base plate 93. Laterally outwardly extending pairs of pins 94 and 96 are connected to mounting blocks 98 and 100, respectively. Front and rear pins 94 and 96 are movably slideably mounted in slots 88 an 90 so that locator assembly 92 can be slideably moved from a first rest position whereat pins 94 and 96 are located at the leading end of slots 88 and 90 (FIG. 7) to an operative position whereat pins 94 and 96 are located at the trailing end of slots 88 and 90 (FIG. 8), the operative position being the position of locator assembly 92 while cutting means 60 moves through the cutting stroke.

A shock absorber 102 (FIG. 10) is mounted to a trailing end of locator assembly 92 on a trailing end block 104, which end block 104 is attached to base plate 93 between mounting blocks 100. Shock absorber 102 includes a pusher 106 that laterally extends through a hole 108 in trailing end block 104, pusher 106 including a coil spring 110 operably mounted therearound. A proximity switch 112 attaches to the bottom of locator assembly 92 on a bracket 114 with bracket 114 extending in a direction downstream from locator base plate plate 93 so that proximity switch 112 is located generally below pusher 106. Proximity switch 112 is operably connected to a controller 113 (FIG. 8).

A target disk 116 (FIG. 7) is adjustably mounted to trailing end plate 77 of carriage 58 by a threaded rod 120 that extends in an upstream direction toward locator assembly 92. Threaded rod 120 aligns with pusher 106 so that pusher 106 abuts the end of threaded rod 120 and/or target disk 116 to urge locator assembly 92 in an upstream direction away from target disk 116. Proximity switch 112 is located so that, when locator assembly 92 is forced toward trailing end plate 77, proximity switch 112 moves adjacent and senses the presence of target disk 116, at which time proximity switch 112 signals controller 113 to actuate cutting means 60.

Figure 6:
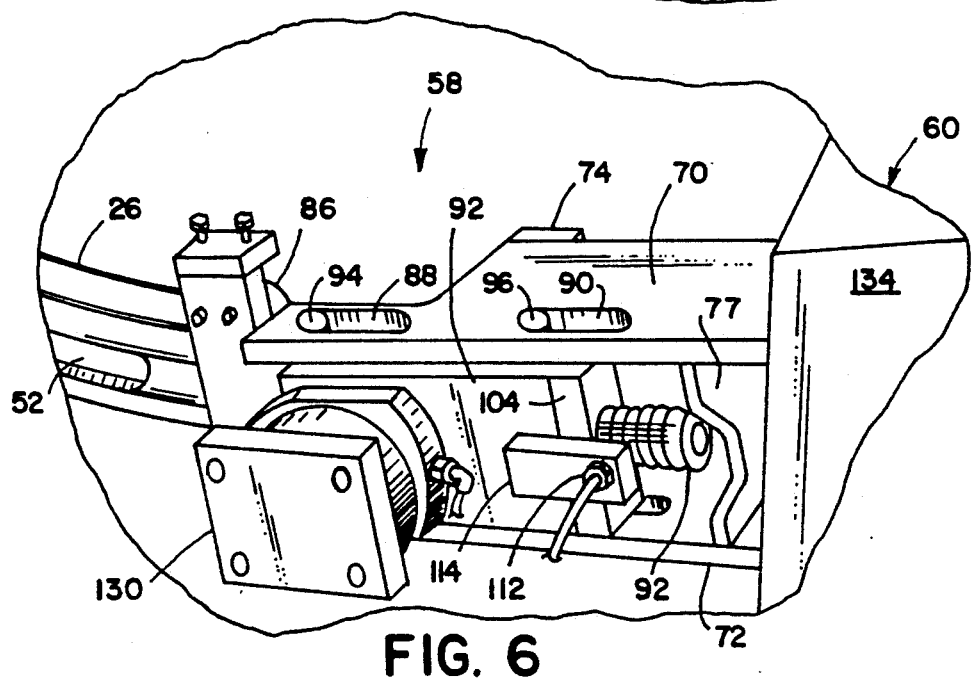
FIG. 6 is a bottom perspective view of the pickup apparatus as shown in FIG. 3 when viewed in the direction A.

A bushing block 124 (FIG. 10) mounts between the leading mounting blocks 98 on locator assembly 92, near the upstream end of locator assembly 92 on the top side of base plate plate 93, and includes a hole 126 therein. A locator pin 128 extends upwardly through hole 126 and also through a hole 128 in locator assembly 92. A linear pneumatic actuator 130 operably connected to controller 113 is mounted to the bottom of locator assembly 92 and operably connected to locator pin 128 for extending locator pin 128 upwardly through locator assembly 92 into the aperture 52 (FIG. 2) in front side 32 of element 26. Thus, locator pin 128 securely and positively registers locator assembly 92 with a particular location on element 26. With locator pin 128 extended into aperture 52, locator pin 128 engages the trailing end of aperture 52 causing locator assembly 92 to move with elongate shaped 26. As proximity switch 12 approaches and senses target disk 116, cutting means 60 is actuated. Notably, locator pins 94 and 96 approach and engage the trailing ends of slots 88 and 90 (FIG. 6) as proximity switch 112 is made, thus causing carriage 58 to move with element 26 as cutting means 60 is actuated. Once the cutting stroke is completed, controller 113 causes actuator 130 to retract locator pin 128, thus allowing spring biased shock absorber 102 to returningly bias locator assembly 92 to the rest position.

Cutting means 60 (FIGS. 7 and 8) includes a box-like cutting chamber 134 that is pivotally mounted to the trailing end of carriage 58 by pivot pin 136 on chamber flanges 135, pivot pin 136 extending through flanges 135 and into the trailing ends of side plates 70 and 72 of carriage 58. Chamber 134 is adjustably secured at a given angle to carriage 58 by a linearly adjustable angled brace 138 (FIGS. 7 and 8) that is pivotally connected to cross brace 74 (FIGS. 1, 7 and 8) of carriage 58 and to a side of chamber 134. Thus, by adjusting angle brace 138, the angular relation of cutting chamber 134 to carriage 58 can be adjusted.

Cutting means 60 further includes a blade guide assembly 140 mounted to an upper side of cutting chamber 134 and a chute 142 mounted to a lower side of cutting chamber 134 opposite blade guide assembly 140. Blade guide assembly 140 is preferably mounted to the top of cutting chamber 134 so that waste material produced by the cutting of segments 24 from bumper element 26 are naturally carried downwardly by gravity into and through chute 142.

FIGS. 11–15 disclose cutting means 60 in greater detail Referring to FIGS. 11–14, two wall supporting clamps assemblies 144 and 146 are mounted to the lateral sides of cutting chamber 134. Wall supporting clamp assemblies 144 and 146 include slideable clamps 148 and 150, respectively, that are adapted to slide about ¼ of an inch through the sides of cutting chamber 134 into supporting engagement with the sides 34 and 35, respectively, of bumper element 26. Clamps 148 and 150 include a surface 152 and 154 contoured to engage and support sides 34 and 35 of bumper 26 during the cutting stroke of cutting means 60. Side mounted wall supporting clamp assemblies 144 and 146 include a frame 156 and 158, respectively, to which pneumatic actuators 160 and 162 are mounted, actuators 160 and 162 being operably connected to clamps 148 and 150 to laterally move same into contact with bumper 26.

Figure 3:
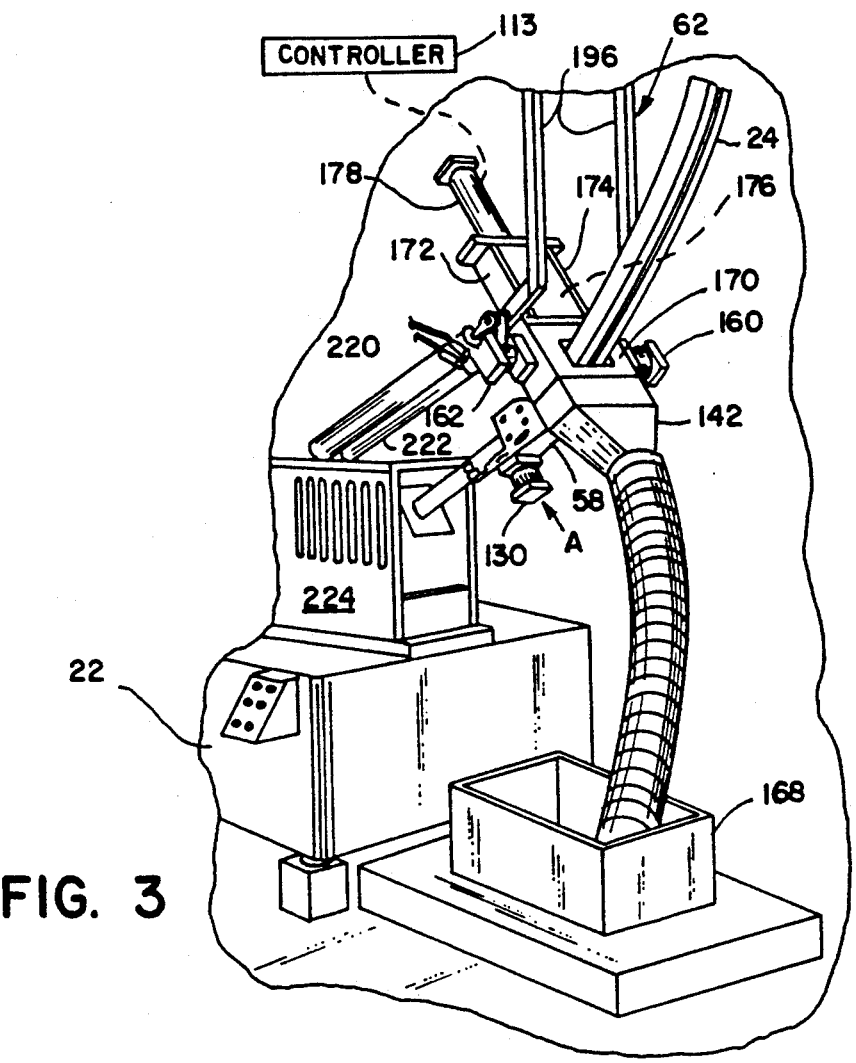
FIG. 3 is a perspective view of the cutoff apparatus shown in FIG. 1.

Blade guide assembly 140 includes a box-like frame 170 (FIG. 3) with side plates 172 and 174 having slots therein for receiving and guiding the edges of blade 176. A hydraulic actuator 178 is operably connected to controller 113, and is mounted to frame 170 and operably connected to blade 176 to extend blade 176 downwardly to engagement with bumper element 26. In particular, blade 176 is mounted between frame side plates 172 and 174 and is movable by an actuator rod of actuator 178 between a normally retracted position (FIGS. 11 and 15) through a cutting stroke (FIGS. 12-14) to a fully extended position (not shown) whereat blade 176 has shearingly cut segment 24 from bumper element 26.

Figure 15:
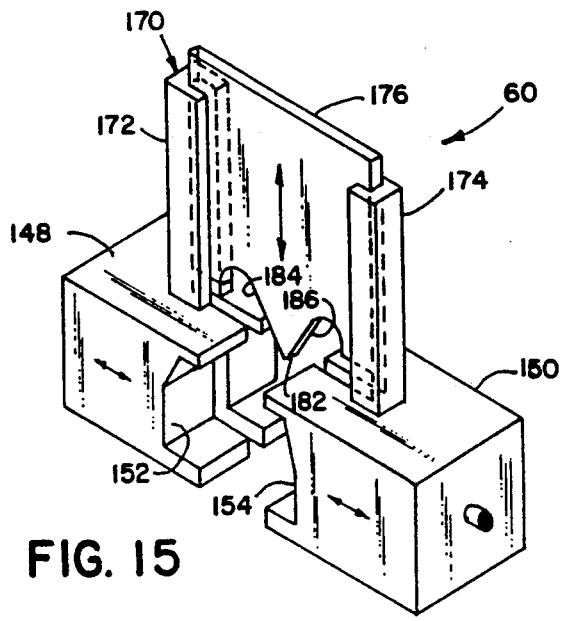
FIG. 15 is a perspective view of the blade and an associated wall supporting clamps.

As disclosed and illustrated in FIG. 15 blade 176 is arranged in a guillotine-like arrangement and has a planar shape including side edges that slidingly ride in the guide slots in side plates 172 and 174. Blade 176 includes a pointed tip 182 adapted to engage and pierce indentation 42 on the rear side 33 of bumper element 26 (FIG. 2). Notably, rear side 33 does not collapse, and the cross-sectional shape of bumper element 26 remains substantially intact as blade tip 182 pierces indentation 42 due to the support received from supporting surfaces 152 and 154 of clamps 148 and 150, the inwardly tapered shape of inclined wall sections 48 and 49, and the general strength and other material characteristics of the material used to form bumper element 26.

Blade 176 (FIG. 15) further includes opposing angular shearing surfaces 184 and 186 that extend at an angle upwardly away from blade tip 182. Shearing surfaces 184 and 186 shearingly cut strips of waste material 164 and 166 (FIG. 12) from bumper element 26 with a scissor-like cutting action against clamp surfaces 152 and 154 as blade 176 is extended through the cutting stroke. Notably, waste material strips 164 and 166 are first cut inwardly (FIGS. 12 and 13), and then are cut outwardly (FIG. 14) as blade 176 is further extended through bumper element 26. As blade 176 approaches the fully extended position (FIGS. 13 and 14), blade tip 176 pierces bumper element 26 a second time along indentation 37 and begins to cut an opposite end of waste material strips 164 and 166, blade tip 182 passing between inner wall supporting surfaces 188 formed in the bottom of cutting chamber 134.

During this entire operation counterbalance means 62 (FIGS. 4 and 5) continuously supports the weight of cutting mean 60 and carriage 58 in a suspended "weight free" state, which in the preferred embodiment is about 900 lbs. Counterbalance means 62 supports this weight both while bumper element 26 is being extended through carriage 58, and also while cutting means 60 and carriage 58 are moved along with bumper 26 during the cutting stroke.

Figure 4:
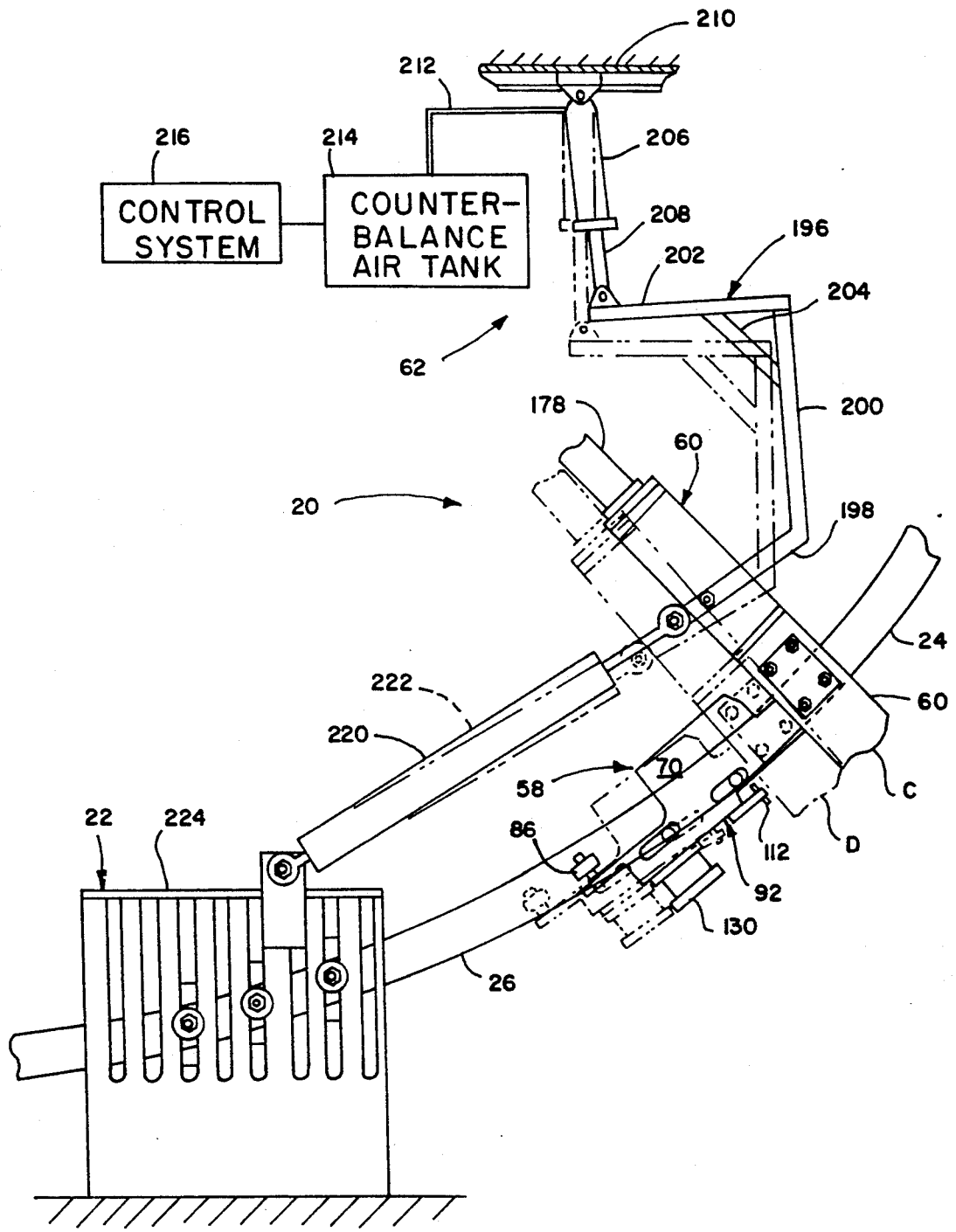
FIG. 4 is a side view of the cutoff apparatus including the counterbalance mechanism, the cutoff apparatus being shown in two different positions during the cutting stroke.
Figure 5:
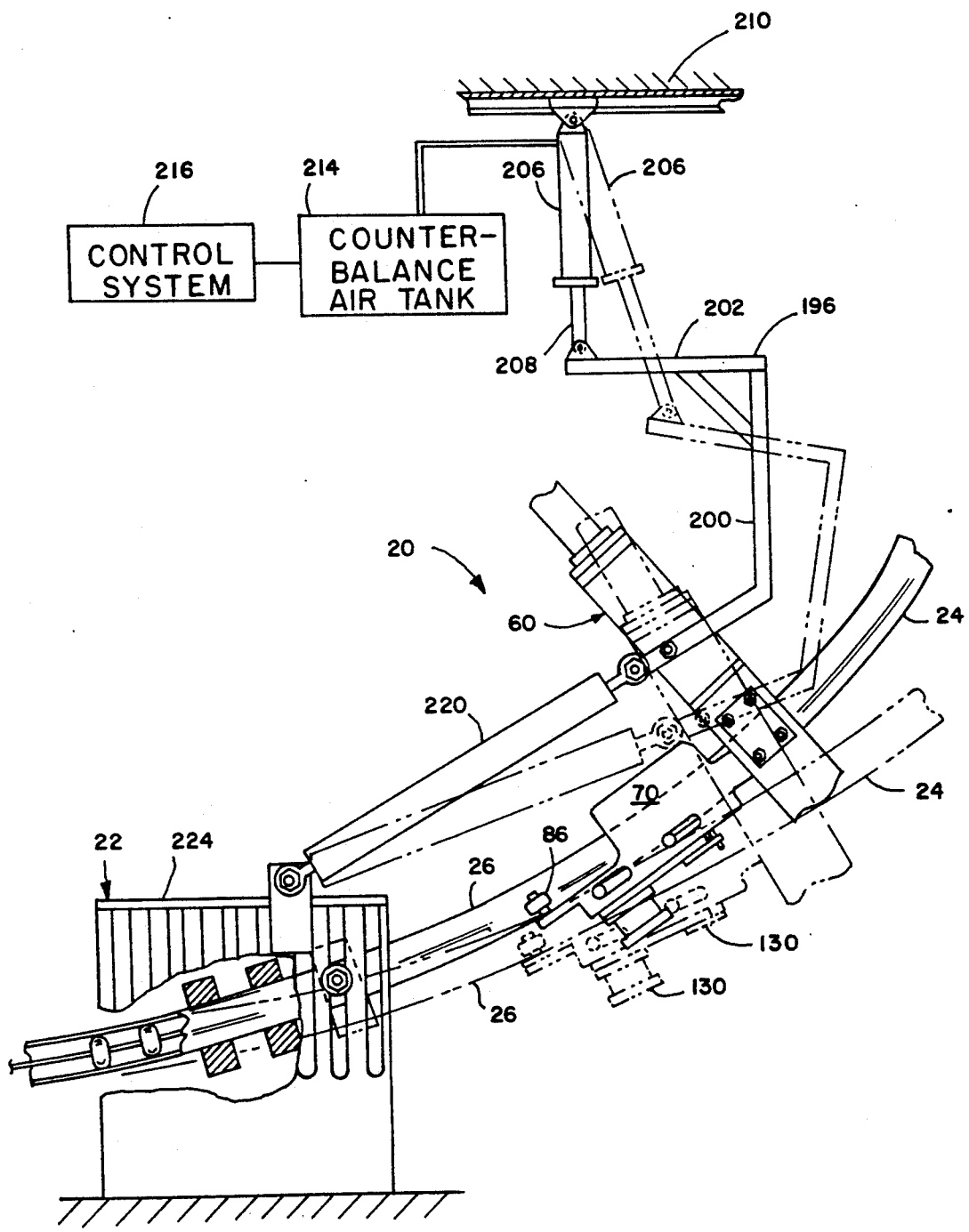
FIG. 5 is a side view of the cutoff apparatus showing the cutoff apparatus in solid lines adjusted to a first level of longitudinal curvature and in phantom lines adjusted to a second level of longitudinal curvature.

Referring to FIGS. 1, 4 and 5 counterbalance means 62 includes a C-shaped main bracket 196 that includes lower legs 198 that pivotally attach to the sides of cutting means 60 so as to support the weight of carriage 58 and cutting means 60. C-shaped main bracket 196 further includes a pair of vertical legs 200 interconnected to lower legs 198 and a pair of upper side braces 202 interconnected to vertical legs 200. A pair of corner braces 204 extend between vertical legs 200 and side braces 202 to provide increased rigidity to main bracket 196.

Counterbalance means 62 also includes an air pivotally supported overhead on support 210 and cylinder 206 having an extendable rod 208 pivotally connected to the upper end of C-shaped bracket 196, air cylinder 206 being pivotally connected to an overhead support 210. Notably, air cylinder 206 may also be slideably mounted to overhead support 210, though testing has shown that this sliding movement is not necessarily needed.

Counterbalance air cylinder 206 is operably connected by air line 212 to a controlled air pressure source such as air pressure tank 214, the air pressure in tank 214 being controlled by controls 216 so that the weight of cutoff apparatus 20 is supported in an equilibrium suspended or "weightless" state. Thus, cutoff apparatus 20 does not tend to rest on or bind bumper element 26 as bumper element 26 is extended from roll-forming machine 22 through cutoff apparatus 20. Concurrently, carriage 58 can utilize rollers to align carriage 58 and cutting means 60 with element 26 without element 26 bearing the weight of carriage 58 and cutting means 60. Due to the triple jointed arrangement by which carriage 58 and cutoff assembly 60 are supported overhead, cutoff apparatus 20 is allowed to pivotally and translatingly follow bumper element 26 as blade 176 shearingly separates segment 24 from bumper element 26.

A pair of return air cylinders 220 and shock absorbers 222 (FIGS. 4 and 5) are operably connected between the trailing output end of roll-forming machine 22 and cutoff apparatus 20. In particular, return air cylinders 220 and shock absorbers 222 are pivotally connected to the sweeping station 224 on the end of machine 22 and to the side plates 172 and 174 of blade assembly 170 (or carriage 58). Once blade 176 has completed its cutting stroke, carriage 58 is in a rotated outwardly position as indicated by position C, and return air cylinders 220 are needed to assure that cutoff apparatus 20 is properly and timely returned to a stationary rest position D adjacent sweeping station 2? 4 ready for the next cutting cycle to begin. Shock absorbers 222 prevent cutoff apparatus 20 from being swung too rapidly to the stationary rest position, thus preventing damage to cutoff apparatus 20.

Auxiliary equipment can be positioned around cutoff apparatus 20 and machine 22 as needed. For example, a waste bin 168 (FIG. 1) is positioned below cutoff device chute 142 to catch waste material 164 and 166, and a conveyor 170 is positioned adjacent cutoff apparatus 20 to catch bumper segments 26 as segments 26 are cut from bumper element 24.

OPERATION

Having described the components and the relationships of various parts of cutoff apparatus 20, the use and operation of apparatus 20 will become apparent to one of ordinary skill in the art. The elongated bumper element 26 (FIG. 1) is initially self-supporting as it extends from sweeping station 224 of machine 22 into and through cutoff apparatus 20. In particular, bumper element 26 extends through carriage 58 on rollers 78, 80, 82, 84, and 86 which in turn aligns bumper element with cutting means 60.

Once a predetermined length of element 26 is processed through roll-forming machine 22, a counting device 228 (FIG. 8), that measures the length of bumper 26 fed out of machine 22, signals controller 113 to actuate locator actuator 130 to extend locator pin 128 into aperture 52 in bumper element 26. As locator pin 128 engages the trailing end of aperture 52, locator assembly 92 is forced to slideably move with elongate shaped 26, locator assembly 92 sliding within slots 88 and 90 on carriage side plate 70 and 72. As locator assembly 92 is carried downstream, proximity switch 112 senses the presence of target disk 116 and actuates actuators 160 and 162 to move clamps 148 and 150 into engagement with the sides of elongate shaped 26. Proximity switch 112 also actuates actuator 178 to extend blade 176.

As blade 176 is extended, blade tip 182 engages indentation 42 on the rear side 33 of bumper element 26 and pierces rear side 33. As blade 176 is further extended, shearing surfaces 184 and 186 shearingly engage main wall section 41 and top and bottom wall sections 34 and 35 with blade 176 cutting strips of waste material 164 and 166 shearingly away from elongate shaped 26, surfaces 184 and 186 acting shearingly against clamps 148 and 150 and lower wall supporting surfaces 188 and 190 to shear the material away. Blade 176 extends far enough so that segment 24 is shearingly separated from elongate shaped 26 with waste material strips 164 and 166 dropping downwardly through chute 142 into waste bin 168.

After being fully extended, blade 176 is retracted to a rest position ready for the next cycle. The total cutting cycle of cutting blade 176 is contemplated to be about one to two seconds, however, various blade speeds can be used depending on the material and blade arrangements found to be most desirable. Once blade 176 is retracted, controller 113 causes clamps 148 and 150 to retract along with locator pin 128. Controller 113 then actuates return air cylinders 220 to return carriage 58 and cutting means 60 to the rest position adjacent sweeping station 224, whereafter cutoff apparatus 20 waits for the next signal from counting device 228.

During this entire operation, the unsevered bumper element 26 is self-supported and the carriage 58 and cutting means 60 are supported by the counterbalance means 62 substantially eliminating the element 26 from supporting the carriage 58 and cutting means 60. Further, as shown in FIG. 4, counterbalance means 62 readily permits the pivoting and translational movement of carriage 58 and cutting means 60 during the cutting stroke. Also, as shown in FIG. 5, counterbalance means 62 also permits ready adjustment of adjustable cutoff apparatus 20 for different elements 2 having different degrees of longitudinal curvature, i.e. different sweeps. In addition, when changing from one bumper cross-sectional profile to another, clamps 148 and 150 are also easily removed and replaced due to their relatively small size and non-complex plate-like shape which has a reduced weight and size, as compared to conventional die stamping type clamping arrangements.

In the foregoing description, it will be readily appreciated by those skilled in the art that modifications can be made to the invention without departing from the concept disclosed herein. Such modifications are to be considered in the following claims, unless these claims by their language expressly state otherwise.

The embodiments of the invention in which an exclusive property or privilege is claimed are defined as follows.

1. A cutoff apparatus for cutting a segment of predetermined length from an elongated shaped element formed on a continuous process, the elongated element defining a longitudinal direction, comprising:
   a carriage movably positioned adjacent the element including a first passageway having means for engaging and guiding the element, said carriage being normally held in a stationary ready position and being movable along with the element during a cutting stroke;
   cutting means operably mounted to said carriage for cutting a segment of predetermined length from the element, said cutting means having a second passageway aligned with the first passageway, said cutting means being normally held in a retracted ready position but being movable with said carriage through a cutting stroke to cut the segment free from the remainder of said element;
   means for moving said carriage and cutting means along with the element during the cutting stroke; and
   counterbalance means for movably supporting said carriage and said cutting means in a substantially "weight-free" state so that the weight of said carriage and said cutting means is carried by said counterbalance means, and said carriage and said cutting means are allowed to pivot and translate as necessary for maintaining proper position of said carriage and cutting means with relation to said element during the cutting stroke.

2. The cutoff apparatus as defined in claim 1 wherein said means for engaging includes means for continuously rollingly engaging opposing sides of the elongated element.

3. A cutoff apparatus as defined in claim 2 wherein said counterbalance means pivotally supports said carriage from a position above said carriage so that said carriage can move in a curved path during the cutting stroke, thus enabling said cutoff apparatus to cut an element that is longitudinally curved.

4. A cutoff apparatus as defined in claim 3 wherein said counterbalance means is readily adjustable so that said carriage and said cutting means can operably receive and cut elongated elements having different degrees of curvature.

5. A cutoff apparatus as defined in claim 4 wherein said counterbalance means is fluid operated.

6. A cutoff apparatus as defined in claim 5 wherein said counterbalance means includes an air cylinder adapted to be movably connected between said carriage and an overhead structure, and further includes a remote air pressure source operably connected to said air cylinder and set at a selected pressure to allow said air cylinder to support said cutoff apparatus in the substantially "weight-free" condition.

7. A cutoff apparatus as defined in claim 1 wherein said cutoff means includes a plate-like blade.

8. A cutoff apparatus as defined in claim 7 wherein said blade includes a tip adapted to engage and pierce the elongated element, and further includes an angular shearing surface extending angularly away from said tip for shearingly cutting a strip of waste material from the elongated element.

9. A cutoff apparatus as defined in claim 8 including wall support means movably mounted to said carriage and adapted to support the walls of the elongated element on the exterior side thereof, said wall supporting means being movable into engagement with the elongated element at least during the cutting stroke so that the elongated element is not undesirably deformed during the cutting stroke.

10. A cutoff apparatus as defined in claim 9 wherein said shearing surface of said blade slidingly passes adjacent the wall supporting means during at least part of the cutting stroke so that a strip of waste material is sheared from the elongated element between said shearing surface of said blade and said wall supporting means.

11. A cutoff apparatus as defined in claim 10 including a chute mounted to the bottom of said carriage below said blade for directing the strips of waste material away from the cutoff apparatus.

12. A cutoff apparatus as defined in claim 1 including wall supporting means movably mounted to said cutting means and adapted to support the walls of an elongated element having a tubular cross section, said wall supporting means being movable into engagement with the elongated element at least during the cutting stroke so that the elongated element is not undesirably deformed during the cutting stroke.

13. A cutoff apparatus as defined in claim 1 wherein said means for engaging includes rollers for rollingly engaging the elongated element as the elongated element extends past said carriage, said rollers aligning said carriage with the elongate element.

14. A cutoff apparatus as defined in claim 13 including a front pair of rollers, a rear pair of rollers, and a pair of side rollers, each engaging the elongated element for aligning the cutoff apparatus both front to rear and side to side.

15. A cutoff apparatus as defined in claim 1 including a proximity sensor adapted to sense the position of the elongated element, said proximity sensor being operably connected to said means for moving so as to controllably actuate said means for moving.

16. A cutoff apparatus as defined in claim 15 wherein said means for moving includes an extendable pin operably mounted on said carriage that can be extended into engagement with the elongated element so as to be positively engaged by the elongated element.

17. A cutoff apparatus as defined in claim 1 wherein said means for moving said carriage includes a means for returning said carriage to the ready position after said carriage has been moved and the cutting stroke completed.

18. A cutoff apparatus as defined in claim 17 wherein said means for returning said carriage includes a cylinder connected to said carriage and to a means which is station with respect to a roll-forming machine.

19. A cutoff apparatus for cutting an end segment of a predetermined length from a roll-formed element being formed by a roll-forming apparatus, said end segment of the roll-formed element having a sweep therein, the roll-formed element defining a longitudinal direction and being continuously moved in the longitudinal direction, the sweep of said end segment being in a direction transverse to said longitudinal direction, comprising:
 a movably supported carriage; means on said carriage for engaging said roll-formed element at said end segment;
 means for movably supporting said carriage for movement with the end segment of the roll-formed element for a predetermined distance as the roll-formed element is being continuously formed and moved;
 cutter means operably mounted to said carriage for cutting said segment from the roll-formed element as the roll-formed element is being formed by said roll-forming apparatus, said cutter means including a blade; and
 an overhead support movably supporting said carriage and cutter means substantially in a "weight free" state so that said carriage can pivot and translate as necessary to accommodate the sweep of said segment to thereby minimize undesirable stress on the roll-formed element and prevent binding of the blade as the end segment of said roll-formed element extends through said carriage and is cut by said cutter means.

20. A cutoff apparatus as defined in claim 19 wherein said overhead support includes means for adjustably supporting said carriage and cutter means so that said carriage and cutter means are readily adjustable for receiving roll-forming elements having end segments of different sweeps therein.

21. A cutoff apparatus as defined in claim 20 wherein said means for adjustably supporting automatically adjust to a change in the degree of sweep in the segment of the roll-formed element.

22. A cutoff apparatus as defined in claim 19 including wall supporting means positioned in said carriage for supporting a roll-formed element having a tubular cross-sectional shape, so that said blade can pierce and cut the roll-formed element without undesirably deforming the tubular cross-sectional shape of the roll-formed element during the cutting operation and without requiring support from the interior of the cross-sectional shape.

23. A roll-forming apparatus comprising:
 a roll-formed machine including a sweeping station for forming a sweep in an elongated roll-formed element;
 a cutoff apparatus positioned adjacent the output of said roll-forming machine for cutting segments having a predetermined length from the elongated roll-formed element, the elongated element defining a longitudinal direction, the cuttoff apparatus including:
 a carriage movably positioned adjacent the elongated element, said carriage being normally held in a stationary ready position but being movable along with the elongated element at least while the elongated element is being cut;
 cutting means operably mounted to said carriage for cutting the elongated element at a predetermined location so as to separate a particular segment from a remaining portion of the elongated element, said cutting means being normally held in a substantially retracted rest position but being movable through a cutting stroke during which the particular segment is cut free, said carriage being movable at least during the time in which said cutting means is being moved through the cutting stroke;
 means for moving said carriage and cutting means along with the elongated element during the cutting stroke; and
 counterbalance means for movably supporting said cutoff apparatus in a "weight free" state so that the weight of said cutoff apparatus is born by said supporting means and said cutoff apparatus is allowed to pivot and translate as necessary to minimize undesirable stress on the elongate element and to minimize bending of said cutting means during the cutting stroke.

24. A roll-forming apparatus as defined in claim 23 including a counter means for measuring the movement of the elongated element, said counter being operably connected to the means for moving and the cutting means for actuating same.

25. A roll-forming apparatus as defined in claim 23 wherein said carriage includes means for engaging the elongated element to guide the elongate element through the carriage.

26. A cutoff apparatus for cutting segments of predetermined lengths from an elongated element formed on a continuous roll-forming process comprising:
 a carriage having a passageway for slideably receiving and guiding said elongated element as it passes therethrough, said carriage including means for automatically engaging said elongated element so that said carriage temporarily moves with said elongated element, and further including means for automatically periodically returning said carriage to a start position;
 cutting means operably connected to said carriage for receiving said element from and as guided by said carriage; said cutting means having means for cutting said element into predetermined lengths; and
 counterbalancing support means for supporting said carriage and cutting means in space in a suspended substantially "weight free" state thereby substantially eliminating said elongated element from bearing the weight of said carriage and cutting means.

27. The cutoff apparatus of claim 26 in which moving means is provided for the elongated element to move the carriage and cutting means, said moving means triggering the sensor to initiate operation of the cutting means.

28. The cutoff apparatus of claim 27 in which the moving means for moving the carriage and means includes an extendable pin operably mounted on said carriage, said elongated element engaging said pin and moving the carriage and cutting means along with it.

29. The cutoff apparatus as defined in claim 26 wherein means is provided for returning the carriage and cutting means to their original position prior to being moved by said elongated element.

30. A cutoff apparatus for cutting segments of predetermined lengths from an elongated element comprising:
   a carriage having a passageway for receiving and guiding said element as it passes therethrough;
   a cutting means operably connected to said carriage for receiving said element from and as guided by said carriage; said cutting means having means for cutting said element into predetermined lengths;
   counterbalancing support means for supporting said carriage and cutting means in space of a suspended substantially "weight free" state thereby substantially eliminating said elongated element from bearing the weight of said carriage and cutting means; and
   the carriage including a means for setting the cutting means into operation upon a predetermined length of said elongated element being passed through said carriage.

31. A cutoff apparatus of claim 30 in which the means for setting into operation the cutter means includes sensor means adapted to sense the position of the elongated element in said carriage.

32. A cutoff apparatus of claim 31 in which means is provided for the elongated element to move the carriage and cutting means which in turn triggers the sensor to initiate operation of the cutting means.

33. A cutoff apparatus of claim 32 in which the means for moving the carriage and cutter includes an extendable pin operably mounted on said carriage for engagement with the elongated element whereby the elongated element moves the carriage and cutting means along with it.

34. A cutoff apparatus as defined in claim 33 wherein means is provided for returning the carriage and cutter to their original position prior to being moved by said elongated element.

35. A method for cutting segments of predetermined lengths comprising:
   continuously forming an elongated element;
   providing a guide means for guiding said element as said element is being continuously formed;
   providing a cutting means for cutting said element;
   guiding said element into said cutting means by means of said guide means;
   providing a counterbalancing support means; and
   supporting said guide means and said cutter means by said counterbalancing support means in space in a suspended substantially "weight free" state thereby substantially eliminating said elongated element from bearing the weight of said carrier and cutting means.

36. The method of claim 35 in which the cutting means is put into operation upon a predetermined length of said elongated element being passed through said carriage.

37. The method of claim 36 in which a sensor means is provided for setting into operation the cutting means, said sensor means sensing the position of the elongated element in said carriage.

* * * * *

UNITED STATES PATENT AND TRADEMARK OFFICE
CERTIFICATE OF CORRECTION

PATENT NO. : 5,305,625
DATED : April 26, 1994
INVENTOR(S) : Richard D. Heinz

It is certified that error appears in the above-indentified patent and that said Letters Patent is hereby corrected as shown below:

Column 8, line 32
    After "detail" insert --.--;

Column 10, line 15
    "2? 4" should be --224--;

Column 11, line 21
    "elements 2" should be --elements 26--;

Column 15, Claim 30, line 26
    "of" should be --in--.

Signed and Sealed this

Twenty-second Day of November, 1994

Attest:

BRUCE LEHMAN

*Attesting Officer*     *Commissioner of Patents and Trademarks*